United States Patent [19]

Faccone

[11] 4,439,233
[45] Mar. 27, 1984

[54] DIRECT REDUCTION OF IRON

[75] Inventor: Dominic M. Faccone, Matthews, N.C.

[73] Assignee: Midrex Corporation, Charlotte, N.C.

[21] Appl. No.: 492,526

[22] Filed: May 9, 1983

[51] Int. Cl.³ ............................................. C21B 13/02
[52] U.S. Cl. ............................................ 75/35; 75/91
[58] Field of Search .............................. 75/34, 35, 91

[56] References Cited

U.S. PATENT DOCUMENTS 3,764,123 10/1973 Beggs et al. ............................. 75/35
4,348,226 9/1982 Aoki et al. ............................... 75/35
4,370,162 1/1983 Dominguez-Ahedo et al. ...... 75/35

Primary Examiner—M. J. Andrews
Attorney, Agent, or Firm—Ralph H. Dougherty

[57] ABSTRACT

A method of making high quality reducing gas for the direct reduction of iron wherein natural gas and steam are passed through a steam reformer to form a high temperature reducing gas, followed by mixing the high temperature reducing gas with spent top gas from a direct reduction shaft furnace, then passing the mixture through a stoichiometric reformer to form a high quality reducing gas for introduction to the shaft furnace.

11 Claims, 2 Drawing Figures

DIRECT REDUCTION OF IRON

BACKGROUND OF THE INVENTION

Over the past two decades, direct reduction of iron from iron ore or pelletized iron oxides has become an important process for producing what is commonly termed sponge iron. This product is used in steelmaking furnaces such as electric arc furnaces without the necessity of utilizing blast furnaces which require high capital expenditures. Direct reduction processes as practiced today utilize a procedure known as "reforming" of reducing gas from carbonaceous material. Reforming constitutes the conversion of natural gas or other carbonaceous material into carbon monoxide and hydrogen, both of which are well known reductants or reducing agents. Reforming of reducing gas can be accomplished in stoichiometric reformers as disclosed in Beggs et al. U.S. Pat. No. 3,764,123, or by steam reforming as disclosed in Celada et al U.S. Pat. No. 3,423,201.

SUMMARY OF THE INVENTION

The present invention is a method of making a high quality reducing gas for the direct reduction of iron in which natural gas is reformed into a high temperature reducing gas in a steam reformer, upgraded and mixed with a stoichiometrically reformed second hot reducing gas to form a high quality reducing gas mixture for introduction to a direct reduction shaft furnace as reductant. The employment of both a stoichiometric reformer and a steam reformer will improve the thermal efficiency of any plant that has an existing steam reformer, and this will minimize capital investment requirements while increasing productivity.

OBJECTS OF THE INVENTION

It is the primary object of this invention to provide a method for making a high quality reducing gas for the direct reduction of iron utilizing a steam reformer, a stoichiometric reformer, and off-gas from the direct reduction of iron in a shaft furnace.

It is another object of this invention to provide a method for the direct reduction of iron with a high thermal efficiency.

DETAILED DESCRIPTION

Figure 1:
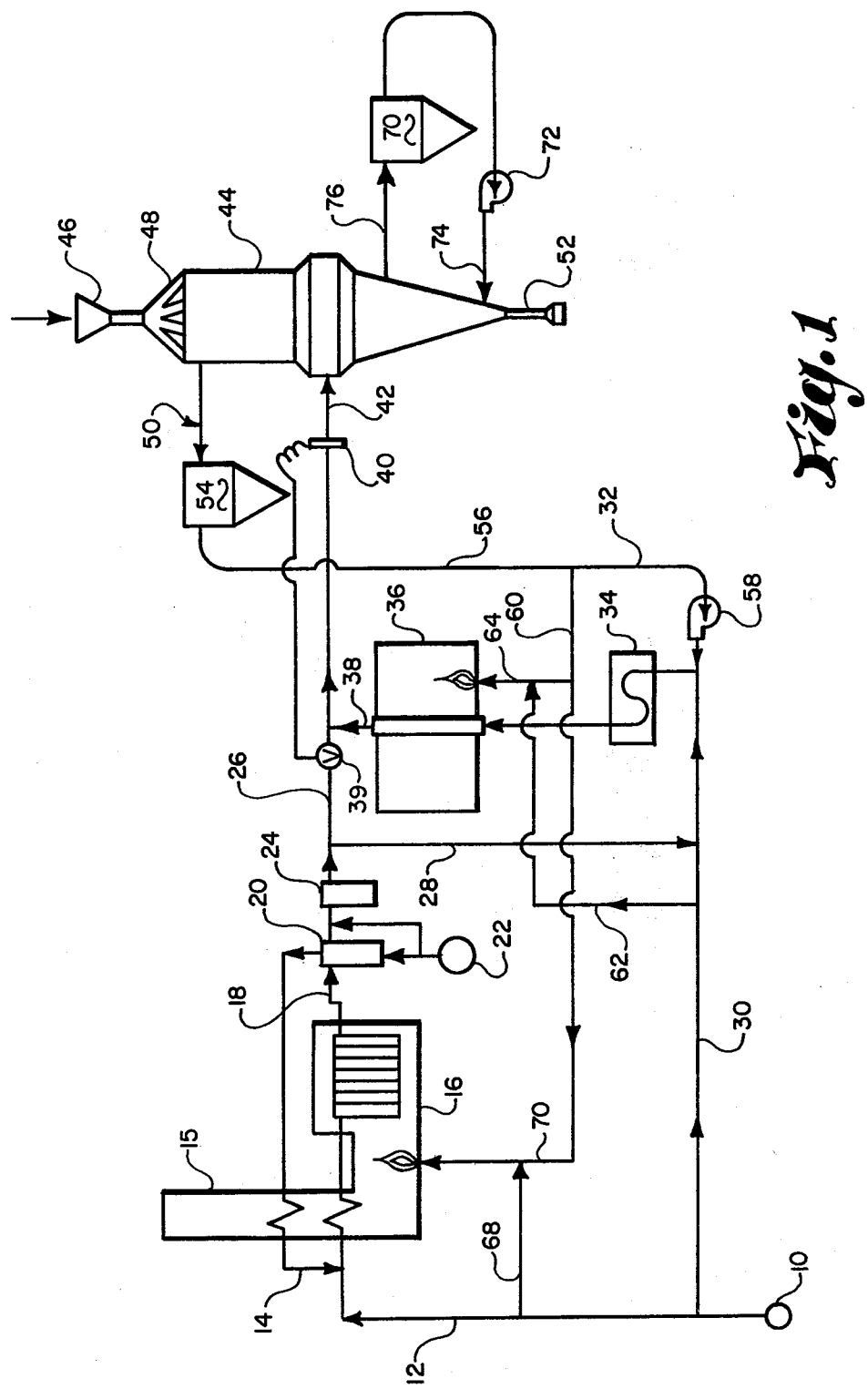
FIG. 1 is a schematic drawing of the invented method utilized to produce direct reduced iron.

Referring now to FIG. 1, natural gas from source 10 is divided, a portion of the gas flowing through line 12, which is mixed with steam from line 14, after which the steam-natural gas mixture is introduced to steam reformer 16, wherein the following reaction takes place:

$$CH_4 + H_2O = CO + 3H_2$$

Upon exiting reformer 16, the reformed gas passes through a quench boiler 20. Water from source 22 enters the quench boiler 20, wherein it removes heat from the reformed gas, raising the temperature of the water to form steam. The steam is removed from the quench boiler via line 14 which passes through the flue portion 15 of reformer 16, superheating the steam in line 14 before it is mixed with the natural gas from line 12. The cooled or quenched gas passes from quench boiler 20 into quench tower 24, wherein the excess water is condensed and removed. Upon leaving quench tower 24, the reformed gas is divided into a major and a minor stream. The major stream enters line 26, while the minor stream enters line 28, the minor portion being mixed with natural gas from line 30, and with top gas from line 32 to form a gas mixture for stoichiometric reforming. This mixture is heated in preheater 34, then passes through stoichiometric reformer 36, wherein it is reformed to a high quality reducing gas. Reducing gas quality is commonly expressed as the ratio of reductants ($CO + H_2$) to oxidants ($CO_2 + H_2O$) in the gas mixture. A reductant to oxidant ratio of 5 to 1 would be expressed as a quality of 5. Commercial operation experience with natural gas based plants has shown that in order to take full advantage of the inherent chemical efficiency of a counter-flow shaft reduction furnace, the quality of the hot reducing gas should be at least about 8. Upon exiting the stoichiometric reformer through line 38, the high quality reducing gas is tempered, i.e., reduced in temperature, to the desired reducing gas inlet temperature by mixing a small amount of the first quenched reformed gas from line 26 in response to a temperature sensor 40 at the reducing gas inlet or bustle 42 of shaft furnace 44.

The vertical shaft furnace 44 has a feed hopper 46 mounted at the top thereof, into which particulate feed material such as lump ore or metallic oxide pellets are charged. The pellets descend by gravity through one or more feed pipes 48 to formed a packed bed burden within the shaft furnace. The upper portion of the furnace constitutes a reducing zone between the reducing gas intake 42 and the spent gas offtake 50. A pellet discharge pipe 52 is located at the bottom of the shaft furnace 44. Reduced material or metallized product is removed from the furnace through the discharge pipe 52 in a controlled manner. Removal of the metallized product through discharge pipe 52 establishes a gravitational flow of the particulate burden through shaft furnace 44. The reacted or spent top gas exits the shaft furnace through top gas off-take 50 and flows to a cooler-scrubber 54, wherein the gas is cooled and particulates are removed. The cleaned, cooled top gas then passes through lines 56 and 32 to a process gas compressor 58. The compressed top gas is mixed with natural gas from line 30 and steam reformed gas from line 28, then the mixture is preheated and introduced to stoichiometric reformer 36 as set forth above. A portion of the spent top gas is removed from line 56 into line 60 to be used as fuel, both in stoichiometric reformer 36 and in steam reformer 16. Natural gas may be withdrawn from line 30 through line 62 and mixed with the spent top gas in line 64 to form the stoichiometric reformer fuel. Likewise, natural gas may be withdrawn from line 12 through line 68 and mixed with spent top gas from line 70 to form the fuel gas mixture for steam reformer 16. The small amounts of fresh natural gas, when mixed with cleaned, cooled reacted top gas will sustain the endothermic reactions in either type of reformer.

The lower portion of shaft furnace 44 constitutes a cooling zone. A cooling gas loop recirculating system is provided at the discharge end of the shaft furnace to cool the particulate burden prior to its discharge. This system, which is described in U.S. Pat. No. 3,764,123, preferably includes a cooler-scrubber 70, a recirculating gas blower 72, a gas inlet 74 connected to a gas distributing member, not shown, located within furnace 44, a gas collecting member, not shown, positioned above the gas distributing member within the furnace, gas outlet 76, and associated gas circulating pipes and connections.

Figure 2:
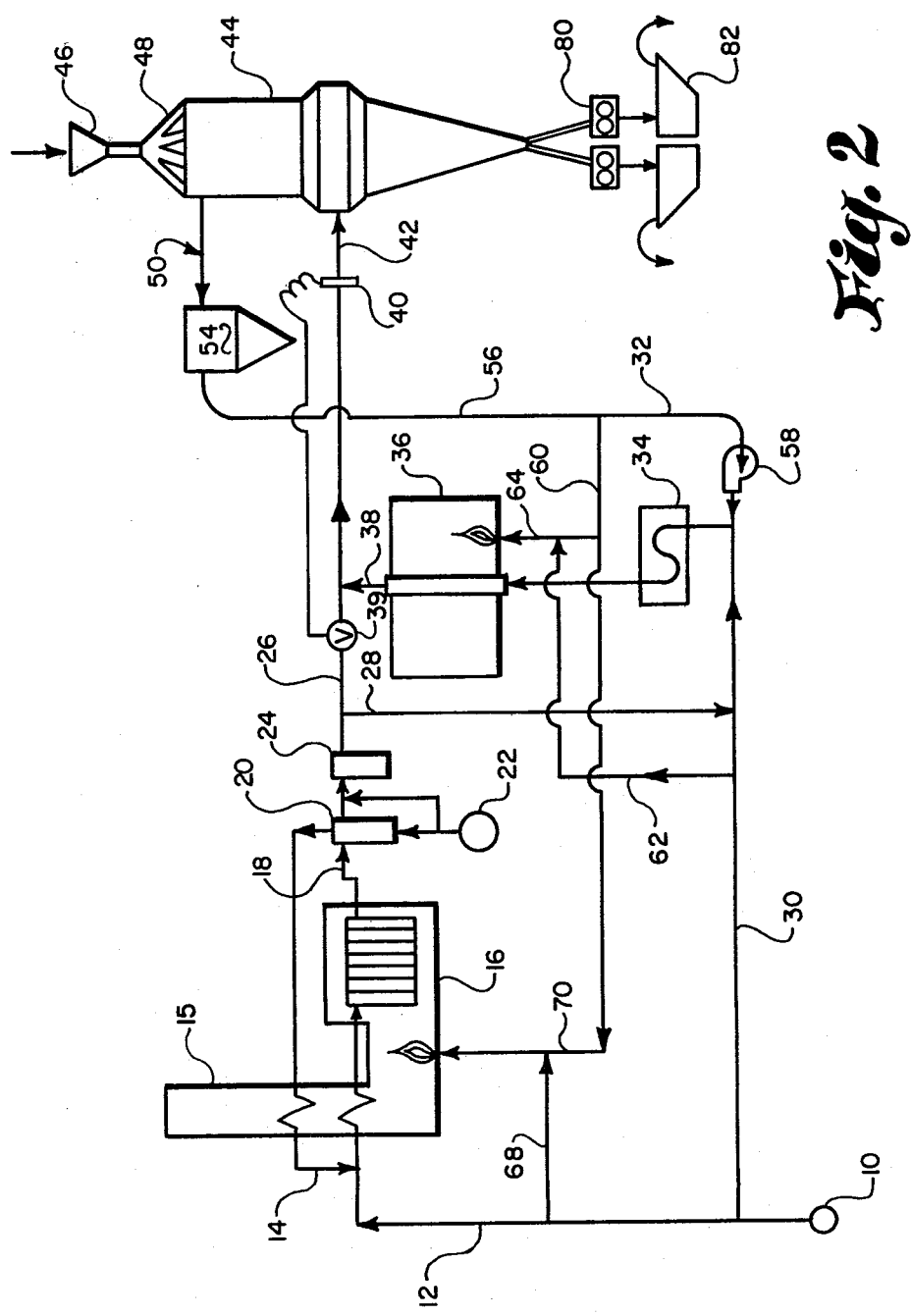
FIG. 2 is a schematic drawing similar to FIG. 1 showing the invented method used to produce hot briquetted iron.

In the alternative embodiment shown in FIG. 2, the gas circulates within the process in exactly the same manner as that set forth above and shown in FIG. 1, however, there is no cooling zone within the shaft furnace 44. Instead, the direct reduced particulate material is discharged hot into one or more compacting or briquetting machines 80 to form hot compacts or briquets. After being formed, these briquets pass into a quench tank 82 containing water to cool the briquets for handling.

The operation of the invented process is as follows. Natural gas, preferably desulfurized, from source 10 is divided, a greater portion of it being fed to line 12 and a lesser portion to line 30. The natural gas in line 12 is mixed with superheated steam from line 14, and the mixture is introduced to steam reformer 16 for reforming into carbon monoxide and hydrogen. Steam reforming produces a gas containing a substantial amount of $CO_2$, often up to 7 or 8 percent, and excess steam. The steam is removed by quench boiler 20. Water from source 22 cools the reformed gas and separates the water from the gas. The quench water passing through the quench boiler is heated by drawing heat from the reformed gas to form steam, which then passes through the steam reformer, superheating the steam in pipe 14 for mixture with natural gas from pipe 12. After leaving the quench boiler, the reformed gas passes through a quench tower 24, which lowers its temperature to less than 50° C., generally to about 35° to 40° C., with a $H_2O$ content of about one (1%) percent, then is divided again, the larger portion passing into line 28 where it is first mixed with natural gas from line 30, then with spent top gas from line 32. The resulting gas mixture is heated in preheater 34, then it is introduced into stoichiometric reformer 36, wherein the gas mixture is reformed to very high quality reducing gas. Reducing gas exiting the reformer 36 through line 38 is tempered or reduced in temperature by additions of cooled steam-reformed gas from line 26. The amount of the cooled gas added to the stoichiometrically reformed gas is controlled by a valve 39 in line 26, which in turn is controlled by temperature sensor 40 at the reducing gas inlet 42 to shaft furnace 44. The quality of the reducing gas at the bustle 42 can be as high as 11 in the invented process, with a ratio of $H_2$ to CO of 2:1.

Oxide feed material or lump ore is fed into shaft furnace 44 from hopper 46 through one or more feed legs 48 to form a packed bed burden in the shaft furnace. The reduced burden is removed through product discharge pipe 52 to cause a gravitational flow of the burden through the shaft furnace. The reducing gas passes in counterflow relation through the burden and forms a reacted top gas which is removed from the furnace through spent gas off-take 50 at the top of the furnace. Reacted top gas is cooled and cleaned of particulates in cooler-scrubber 54, then recycled through a process gas compressor 58 to be remixed with the steam reformed gas and natural gas prior to stoichiometric reforming.

From the foregoing, it is clear that I have invented a method for making a very high quality reducing gas for the direct reduction of iron utilizing steam reforming, stoichiometric reforming, and reacted top gas from a counter-flow direct reduction process, which method operates with a very high thermal efficiency.

What is claimed is:

1. A method of making a high quality reducing gas for the direct reduction of iron, comprising:
   introducing natural gas and steam into a reformer to form a high temperature reducing gas;
   cooling said high temperature reducing gas to remove excess steam and form a cooled reducing gas;
   dividing said cooled reducing gas into a first stream and a second stream;
   withdrawing reacted top gas from a direct reduction shaft furnace, cooling and cleaning said reacted top gas, and mixing said reacted top gas with said first stream of reducing gas to form a gas mixture;
   passing said gas mixture through a stoichiometric reformer to form a second hot reducing gas;
   tempering said second hot reducing gas with said second stream of cooled reducing gas to form a high quality reducing gas; and
   introducing said high quality reducing gas into a shaft furnace for the direct reduction of iron oxide therein and forming a reacted top gas.

2. A method according to claim 1 further comprising preheating said gas mixture prior to introducing said gas mixture into said stoichiometric reformer.

3. A method according to claim 1 further comprising mixing natural gas with said gas mixture prior to introducing said gas mixture into said stoichiometric reformer.

4. A method according to claim 1 further comprising removing a portion of said reacted top gas and introducing it to said steam reformer as fuel to heat said steam reformer.

5. A method according to claim 4 further comprising adding natural gas to said reacted top gas to form said fuel to heat said steam reformer.

6. A method according to claim 1 further comprising removing a portion of said reacted top gas and introducing it to said stoichiometric reformer as fuel to heat said stoichiometric reformer.

7. A method according to claim 6 further comprising adding natural gas to said reacted top gas to form said fuel to heat said stoichiometric reformer.

8. A method according to claim 1 further comprising establishing a gravitational burden flow through the shaft furnace with a counterflow of reducing gas therethrough, and forming hot direct reduced iron particles within the furnace.

9. A method according to claim 8 further comprising discharging hot particulate direct reduced product from said shaft furnace.

10. A method according to claim 9 further comprising discharging said hot particulate direct reduced product into a briquetting machine.

11. A method according to claim 8 further comprising cooling said hot particulate direct reduced material in a cooling zone within and near the discharge end of said shaft furnace, and discharging said reduced material from said furnace at a temperature of less than about 200° F.

* * * * *